(12) United States Patent
Iley et al.

(10) Patent No.: US 10,807,291 B2
(45) Date of Patent: Oct. 20, 2020

(54) EXTRUDER

(71) Applicant: BAKER PERKINS LIMITED, Peterborough (GB)

(72) Inventors: Stephen Thomas Iley, Peterborough (GB); Paul Young, Peterborough (GB)

(73) Assignee: Baker Perkins Limited, Peterborough (GB)

(*) Notice: Subject to any disclaimer, the term of this patent is extended or adjusted under 35 U.S.C. 154(b) by 48 days.

(21) Appl. No.: 15/720,671

(22) Filed: Sep. 29, 2017

(65) Prior Publication Data
US 2019/0099934 A1 Apr. 4, 2019

(51) Int. Cl.
| *B29C 48/255* | (2019.01) |
| *B29C 48/285* | (2019.01) |
| *B29C 48/395* | (2019.01) |
| *B29C 48/40* | (2019.01) |
| *B29C 48/68* | (2019.01) |
| *B29K 105/00* | (2006.01) |

(52) U.S. Cl.
CPC ........ *B29C 48/2552* (2019.02); *B29C 48/288* (2019.02); *B29C 48/395* (2019.02); *B29C 48/40* (2019.02); *B29C 48/682* (2019.02); *B29K 2105/251* (2013.01)

(58) Field of Classification Search
CPC ..... B29C 48/288; B29C 48/40; B29C 48/682; B29C 48/395; B29C 48/2552; B29K 2105/251

See application file for complete search history.

(56) References Cited

U.S. PATENT DOCUMENTS

| 3,198,582 A | 8/1965 | Zalis |
| 3,850,415 A | 11/1974 | Hansen |
| 5,169,582 A | 12/1992 | Illing |
| 5,686,219 A | 11/1997 | Higuchi |
| 2017/0165872 A1 | 6/2017 | Renard et al. |

FOREIGN PATENT DOCUMENTS

| CH | 498060 | 10/1970 |
| EP | 0309409 | 3/1989 |
| KR | WO2011043523 | 4/2011 |
| WO | WO/2011/043523 | 4/2011 |

*Primary Examiner* — Robert J Grun
(74) *Attorney, Agent, or Firm* — Royal W. Craig; Gordon Feinblatt LLC

(57) ABSTRACT

An extruder (1) comprising a feed port (10), the feed port is configured to direct material towards a barrel region of an extruder, the feed port comprising a passageway, the passageway arranged to be in communication with the barrel region (11) of the extruder, and the passageway comprises a transverse cross-sectional shape which comprises three substantially rectilinear side surfaces (4a, 4b, 4c) which are arranged substantially orthogonally, and a fourth side (4d) which is non-orthogonally angled relative to two of the side surfaces which are adjacent to the fourth side.

11 Claims, 4 Drawing Sheets

EXTRUDER

BACKGROUND OF THE INVENTION

1. Field of the Invention

The present invention relates to extruders, and in particular, although not exclusively, extruders comprising a twin-screw arrangement and capable of processing various materials.

2. Description of the Background

In polymer production, the extrusion of polymer is a well-established part of the production process. Polymer in powder and/or granular form may be metered at a set rate into a dosing feeder. The polymer material falls under gravity from the dosing feeder through a feed port and into an extruder barrel in which there are driven rotatable screws. The screws are driven to rotate to cause the polymer material to be conveyed away from the feed port and along the barrel. Energy is imparted from the screws to the polymer material in the barrel. This causes the polymer to melt. The materials are melted and dispersed along the length of the barrel until exiting from the discharge cud of the barrel.

For many years, carious industries have struggled to adequately feed low bulk density materials into twin screw extruders. When top feeding formulations of a low density, air is introduced into the material before it enters the extruder barrel due to the drop in height between the dosing feeder and extruder barrel. The velocity of the particles causes them to bounce on the surface of the feed screws inhibiting entry into the screw flights.

As the material enters the extruder barrel and is consolidated within the ever tightening helix of the screws (along the axis of rotation), the air trapped within the barrel is forced back towards the feed port area, further introducing increased turbulence of the lighter elements of the feed material. This can cause the material to back up in the feed tube, eventually leading to total loss of throughput. The erratic nature of how the materials enter the barrel places undue variation of load on the drive train. As the main drive motor attempts to maintain a constant speed, the uneven load causes the torque to fluctuate. What is needed is an improved extruder that addresses this problem.

SUMMARY OF THE INVENTION

According to the invention there is provided an extruder comprising a feed port, the feed port is configured to direct material towards a barrel region of an extruder, the feed port comprising a passageway, the passageway arranged to be in communication with the barrel region of the extruder, and the passageway comprises a transverse cross-sectional shape which comprises three substantially rectilinear side surfaces which may be arranged substantially orthogonally, and a fourth side which is non-orthogonally angled relative to two of the side surfaces which are adjacent to the fourth side.

Each of the side surfaces may be substantially linear in transverse cross-section. By 'transverse' we include generally transverse or lateral to the direction of extent of the feed port. Each of the side surfaces is substantially smooth. One of the side surfaces may be longer than an opposite side surface. The side surfaces may be connected by junctions, which junctions are of curved or rounded or radiused transverse cross-sectional shape.

An angle of inclination of the fourth side relative to an adjacent side may be in the range 40 degrees to 80 degrees, 50 degrees to seventy degrees, 60 degrees to seventy degrees, 62 degrees to 68 degrees, 64 degrees to 66 degrees, or substantially 65 degrees.

The fourth side may be arranged to be orientated towards a direction of flow material in the barrel region (as brought about by the sense of rotation of screws of the extruder). The barrel region may be formed in a barrel body.

The passageway of the feed port may have substantially constant/uniform dimensions or shape or aspect ratio for at least part of the extent of the passageway (in the direction of flow). The substantially constant shape or aspect ratio may be a finite or discrete length.

The passageway may have a cross-sectional shape which is substantially a trapezium in which (only) two side surfaces are substantially parallel. Taking into account inclusion of curved/rounded shape of the junctions, the shape of the outlet may be viewed as a modified trapezium. The junctions may be considered as junction regions.

The barrel region may comprise at least one bore of substantially uniform diameter. The barrel region may comprise two bores.

The extruder may comprise a transitional region which includes a widened or enlarged region which tapers to the diameter of the bore. Where the extruder comprises two bores the transition region tapers down to the diameter of each of the bores. The transition region may include one or more substantially (at least in part) conical surfaces. The transition region may be considered as having a volume which reduces in a generally downstream direction (towards the bores). The transition region may be considered as part of the barrel region.

The bores may be substantially defined by shaped internal surfaces on two blocks, one block located on top of the other, and the blocks substantially form a barrel body. The enlarged or widened transition region may be provided at least in an upper region, internal of the barrel body.

The extruder may comprise a block of material which is connected to an uppermost part of the barrel body, and the feed port may be defined by shaped surfaces formed in the block. Said block may be termed a barrel (body) casing/housing block. The extruder may be a twin screw extruder. The extruder may be a co-rotating extruder.

The extruder may be arranged configured or suitable for use with polymer material. By 'polymer material' we include materials having a molecular structure which includes chains or rings of linked repeating monomers. We also include thermosetting and thermoplastic materials, and more generally include plastics materials. The extruder may comprise two bores, each bore containing a respective extruder screw.

The axes of rotation of the screws may be substantially parallel. Screws may be termed rotors, and may comprise helical blades or flights extending along the respective axis of rotation. The configuration of the flights may vary along the axial length of the screws. The screws may be said to have a variable geometry. For example, the screw geometry (such as pitch, helix angle and flight width, channel width, root, etc.) may have certain characteristics present along one portion, and different characteristics along a different portion.

According to another aspect of the invention there is provided an extruder barrel assembly and a feed port to communicate with a barrel region, the barrel region defined internally of the barrel assembly, and the feed port comprises the feed port of the first aspect of the invention.

Another aspect of the invention relates to a barrel of an extruder in which an (upstream) feed region has an enlarged or widened volume, as compared to a (downstream) bore region.

According to yet a further aspect of the invention there is provided an extruder screw, for use as one of a twin-screw arrangement for an extruder, the screw comprising a feed portion and a work portion, the feed(er) portion arranged to convey material received through the feed port to the downstream work portion, and the work portion arranged to impart energy to the material, and the feed portion comprising a single helical formation, and the work portion comprising two helical formations.

The work portion may comprise at least one helical portion which is of substantially the same pitch as the helical portion of the feed portion. The work portion may comprise two helical portions of substantially the same pitch, which are offset from each other in an axial direction. The helical portion of the feed portion may be arranged to transition into one of the helical portions of the work portion. This is preferably in a smooth and continuous manner.

The work portion may be arranged to impart energy to the material by way of compressive forces. The work portion may be viewed as having a greater number of screw formations (per unit length) in comparison to the feed portion.

The invention may comprise one or more features described in the description, either individually or in combination.

BRIEF DESCRIPTION OF THE DRAWINGS

Various embodiments of the invention will now be described, by way of example only, with reference to the following drawings in which.

DETAILED DESCRIPTION OF THE PREFERRED EMBODIMENTS

Figure 1:
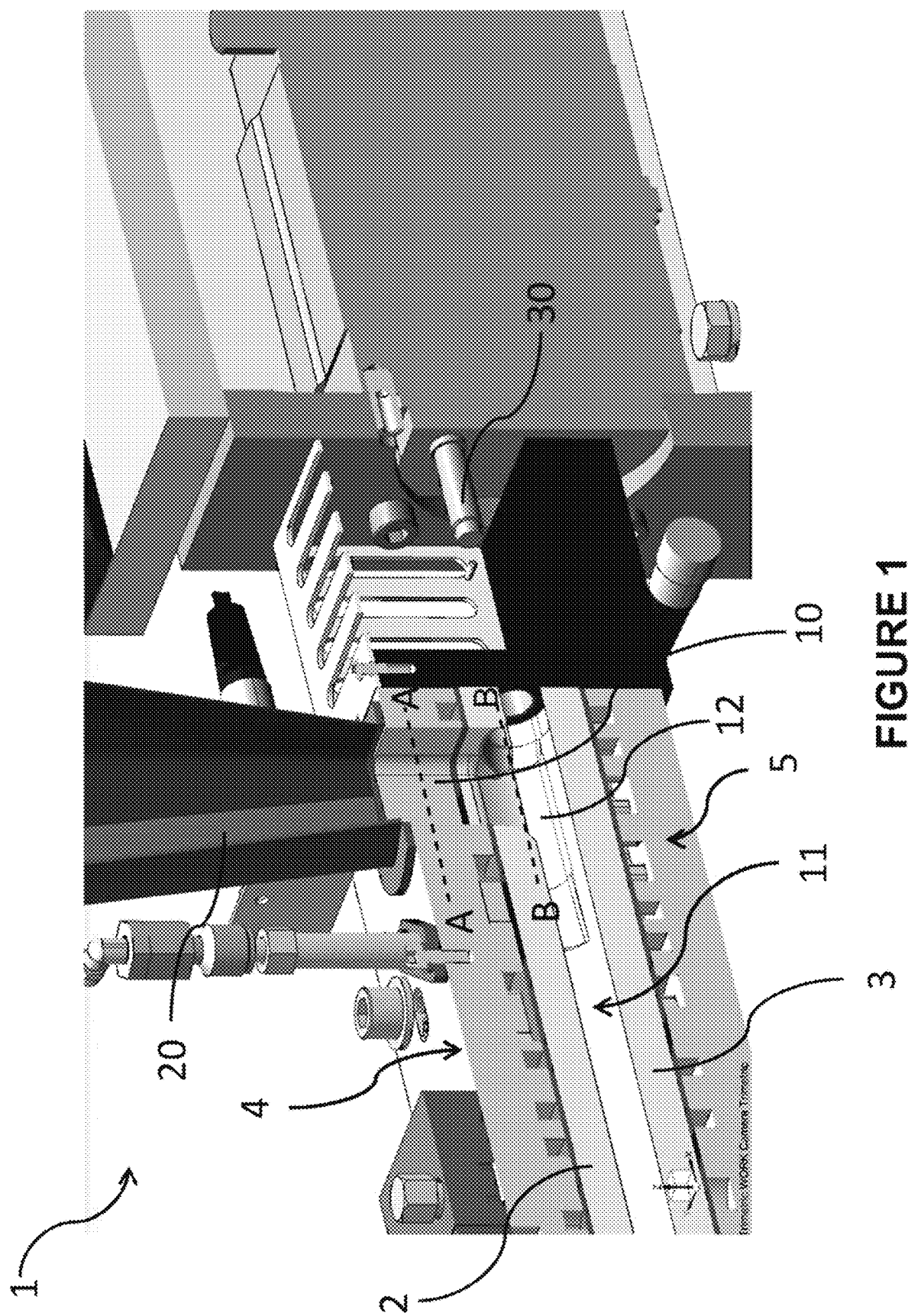
FIG. 1 is longitudinal cross-sectional view of an extruder.

With reference to the figures there is now described a twin screw extruder 1, suitable for processing of polymer in powdered and/or granular form. As will be described in more detail below, the configuration of the feed port and the barrel region give rise to improved material intake and flow characteristics, which leads to improved operational performance of the extruder. The extruder 1 comprises an upper barrel block 2 and a lower barrel block 3. The upper barrel block and the lower barrel block may collectively be referred to as a barrel (block) assembly. The upper barrel block 2 is shaped so as to be located on top of the lower barrel block 3. Each of the blocks 2,3 comprises a respective shaped surface, and the shaped surface of each block 2, 3 is complementary to the other such that the two surfaces define an internal barrel region 11 when the two blocks 2, 3 are brought together. The surfaces defined by each block 2, 3 include two side-by-side constant diameter (overlapping) bore portions, each defining substantially one half of each bore. Both bores are of substantially the same diameter. The bores comprise substantially part-cylindrical (inwardly facing) surfaces.

Figure 5:
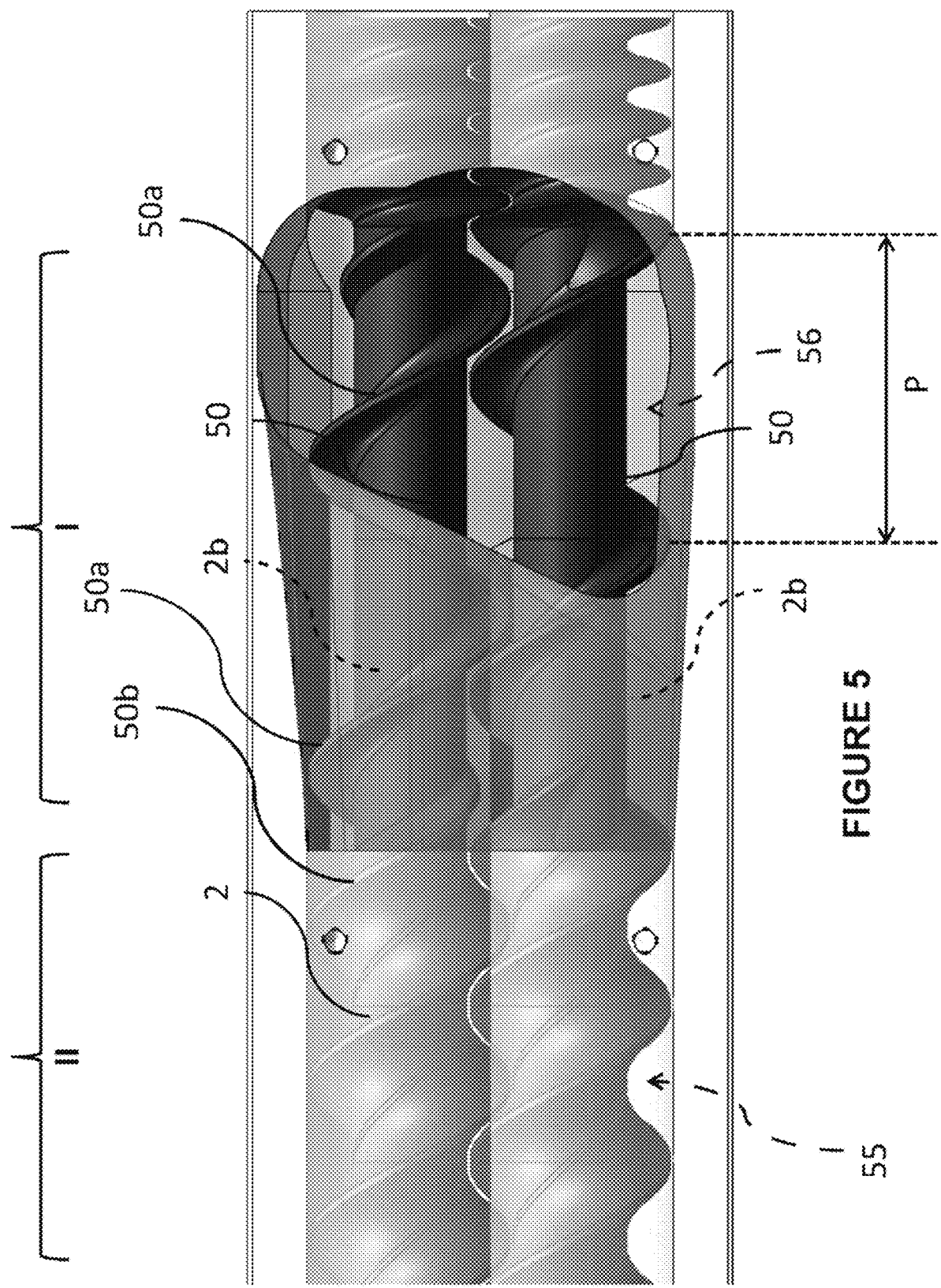
FIG. 5 is a transverse section through an upper barrel block half.

Each bore, accommodates a respective flighted screw 50 (as shown in FIG. 5). Each screw is driven by a respective drive 30 (FIG. 1). Material is fed into a feed intake 10 by way of a feed chute 20. The lower part of the feed chute 20 matches (is complementary to) the profile in the upper backing block 2. The upper part of the feed chute 20 is formed to match that of the particular dosing feeder depending on the particular application for which the extruder is used.

As seen in FIG. 1, each of the barrel blocks 2, 3 further defines surfaces for a transitional region 12, which is located upstream of the barrel portions, and towards a respective distal end region of each of the blocks 2, 3.

Figure 2:
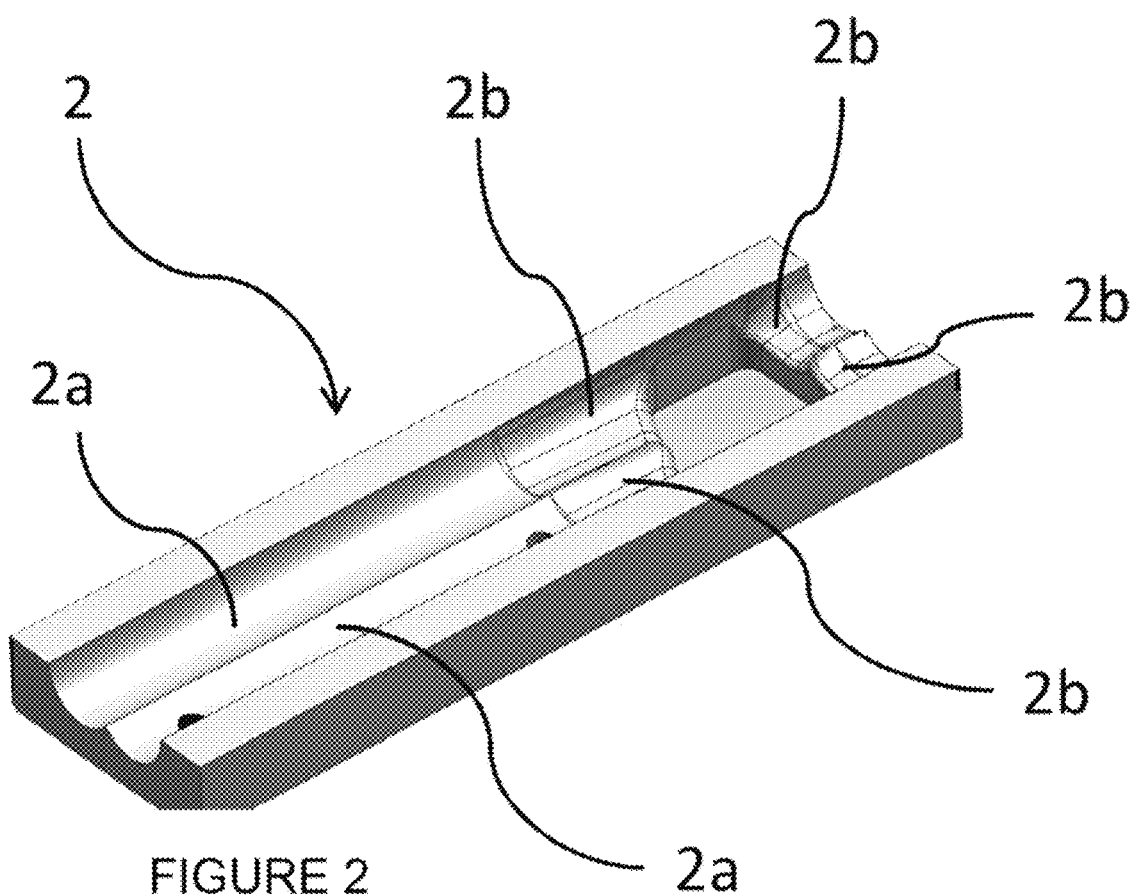
FIG. 2 is a perspective view of an upper half of a barrel block.
Figure 3:
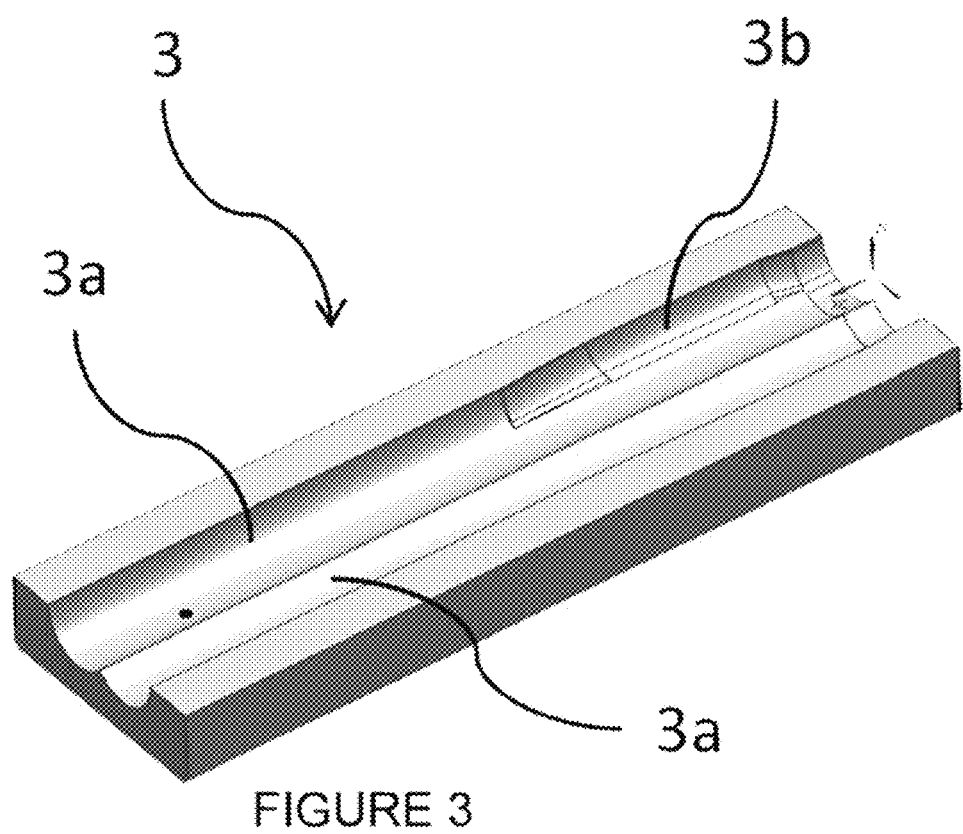
FIG. 3 is a perspective view of a lower half of a barrel block.

With combined reference to FIGS. 2 and 3, the surfaces 2b of the block 2 and surfaces 3b of the block 3, collectively define the transitional region. (The transition region may also be termed a feed region). The surfaces 2b comprise substantially conical portions which taper in a downstream direction. The surfaces 3b are, to a lesser extent than the surfaces 2b, also substantially conical surface portions. The transitional region communicates with the bores. The profiled (internal) surfaces which define the transitional region 12 may be termed a feed liner or barrel liner.

Figure 4:
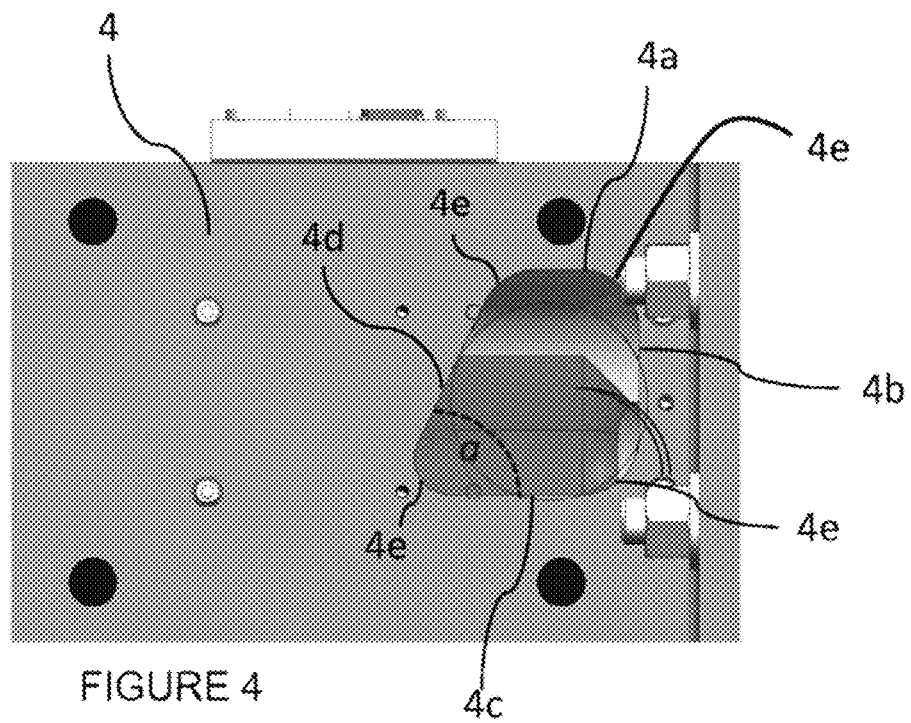
FIG. 4 is a transverse section of a feed port.
Figure 6:
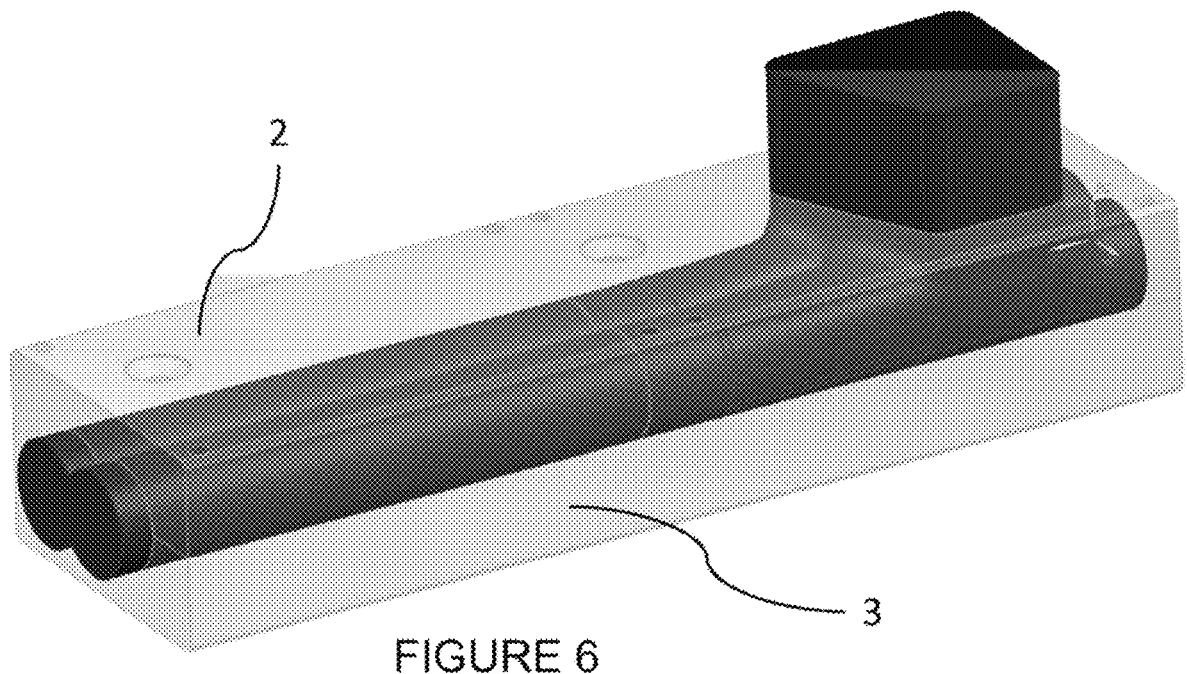
FIG. 6 is a perspective view of the volumetric envelope of material flow.

Reference is now made to FIG. 4 which shows a plan view of the feed port 10 of FIG. 1, formed by a passageway in an upper barrel casing block 4 taken on section A-A. The feed port 10 has substantially constant shape and dimensions throughout the depth of the casing block 4. The transverse cross-sectional profile of the feed intake comprises a quasi- or modified-trapezium shape, which comprises side surfaces 4a, 4b, 4c and 4d. Each of the side surfaces is substantially rectilinear. The side surfaces 4a and 4c are substantially parallel, and the transverse extent or length of the side surface 4c is longer than that of the side surface 4a. Said side surfaces 4c, 4d are connected by way of curved junctions 4e, The side 4a is arranged substantially orthogonal to the side 4, and the side 4b orthogonal to the side 4c. It may be noted that the extruder 1 also comprises a lower casing block 5, which is located underneath the lower barrel block 3.

The side surface 4d is configured at an incline or non-orthogonal angle to each of the adjacent side surfaces 4a and 4c. The side surface 4d is arranged at an angle $\alpha$ of substantially 65 degrees relative to the side surface 4c. The feed intake 10 extends through substantially the full depth of the casing block 4.

Reference is now made to FIG. 5 which shows the cross-section on B-B (see FIG. 1), through the upper barrel block 2, parallel with the direction of its length. This view shows the pathway provided for the material enlarges as it extends through the upper block 2, and develops into a modified shape (in comparison to that of the feed inlet portion which is formed in the upper casing 4. The enlarged region creates increased volume allowing more material to be present within the feed area, thereby increasing the potential throughput. The modified trapezium shape is angled towards the material flow effectively guiding the material into the twin bores. As can also be seen in FIG. 5, the conical profile surfaces 2b are shown, tapering down towards the diameter of the bores. Also shown in FIG. 5 are screws 50, which are shown as having a variable geometry along the axes of rotation.

Particular mention is now made of the screw geometry of the flighted screws 50, with reference to FIG. 5. The screws are arranged in the barrel region as twin, self-wiping co-rotating screws. As will be described in more detail below, each screw has a variable screw geometry, along the respective axis of rotation of each screw. Two portions of each screw will be discussed, namely what will be termed a feed portion and a work portion, denoted (at least for schematic/explanatory purposes) by reference numerals I and II, respectively. The feed portion is arranged to convey material received through the feed port to the work portion. The work portion is downstream of the feed portion, and is arranged to impart an energy, through compression forces, to the material. The feed portion of each screw 50 comprises a single helical flat fronted screw portion 50a. As can be seen in FIG. 5, the screw portion 50a has relatively large pitch, (shown by the reference P), thus advantageously maximising available volume for the material as it is received in the barrel. Progressing in a downstream, axial direction, the screw portion 50a continues, at substantially the same pitch. However, a second screw portion, referenced 50b, is introduced. The second screw portion 50b is offset from the screw portion 50a. The second screw portion 50b has a pitch which is substantially that of the first screw portion 50a. Both of the first screw portion 50a and the second screw portion 50b, in the work portion of the screw, have curved side walls as is evident from FIG. 5. This therefore alters the channel profile 55, as compared to the channel profile 56 at the feed section of the screws. The channel volume in the work portion of the screws provides a reduced volume as compared to the channel volume in the feed portion of the screws. It is also to be noted that what may be termed 'the free volume', i.e. the (inner) volume of the barrel as defined by its internally facing walls, less the volume occupied by the screws, is greater in the feed region as compared to the work region, of the extruder.

It is to be noted that the extent, in situ, of feed portion of each screw 50 largely/substantially corresponds to, or is substantially located within, the extent of the enlarged transition volume of the barrel assembly. It is also to be noted that the work portion of each screw 50 (which comprise the two helical screw formations 50a and 50b) is substantially located with its respective bore.

The combination of the shape of the inlet port 10, the form of the barrel/feed liner in the transitional region 12, in particular advantageously dramatically reduce torque spikes, enabling the extruder to operate at higher rates of throughput. Our studies have shown how the profiled barrel liner and screws allow lighter materials, to fall towards the bottom of the feed area and into the screw flights rather than accumulate in the feed port. The special geometry of the screws within the feed area prevent materials bouncing off the surface of the screws and also allow more materials to fall into the screw flights at an increased rate.

Additional advantages of the extruder high intake feed system include: increased profitability, resulting from increased throughput; increased component reliability, resulting from reduced torque spikes which the components would otherwise be subjected to.

It will be appreciated that although particular mention has been made to the processing of polymer materials, and to low density/low bulk materials, the feed intake arrangement and/or the screw geometry may (either singularly or in combination) be beneficially used with both non-food materials and foodstuffs.

We claim:

1. An extruder, comprising:
a barrel region;
a feed port configured to direct material toward said barrel region, the feed port comprising a passageway in communication said barrel region and the passageway having a transverse cross-sectional shape defined by three adjacent side surfaces one being substantially orthogonal to the other two, and a fourth side surface of the transverse cross-sectional shape that is non-orthogonally angled relative to said three adjacent side surfaces.

2. The extruder of claim 1, in which each of the side surfaces is substantially linear in transverse cross-section.

3. The extruder of claim 1, in which one of the side surfaces is longer than an opposing side surface.

4. The extruder of claim 1 in which the side surfaces are connected at rounded junctions.

5. The extruder of claim 1, wherein said fourth side has an angle of inclination relative to an adjacent side within a range of from 40 degrees to 70 degrees.

6. The extruder of claim 1, wherein the passageway of the feed port has a substantially constant cross-section extending over at least a portion of the passageway.

7. The extruder of claim 1, wherein the passageway of the feed port has cross-sectional shape defined as a trapezium.

8. The extruder of claim 1, wherein the passageway of the feed port has three substantially rectilinear side surfaces arranged substantially orthogonally, and a fourth side that is non-orthogonally angled relative to two adjacent side surfaces.

9. The extruder of claim 8, wherein only two of said side surfaces are parallel.

10. The extruder of claim 1, further comprising a conical transition region.

11. The extruder as claimed in claim 10 in which the conical transition region is at least partially defined by a conical surface.

* * * * *